(No Model.)
J. BACHMAN.
FRICTIONAL DRIVING DEVICE.
No. 350,471. Patented Oct. 12, 1886.
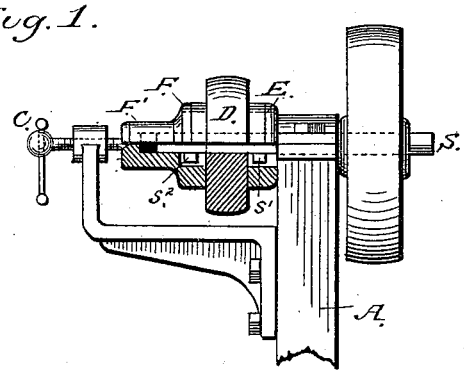
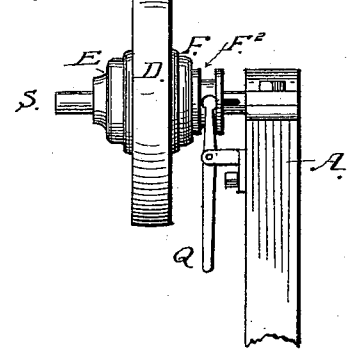
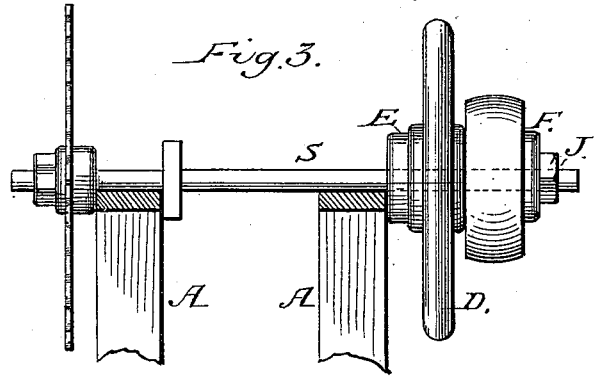
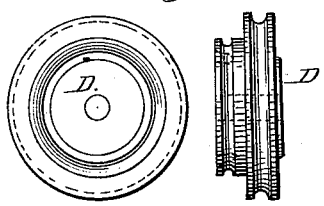
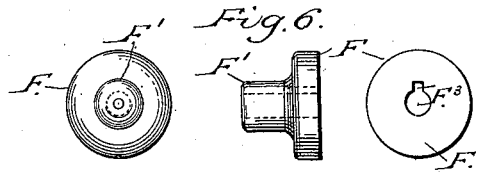
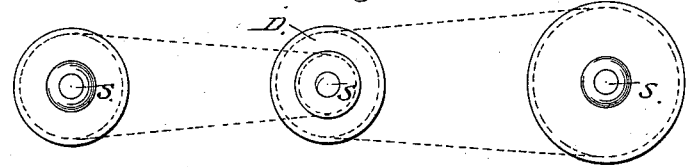
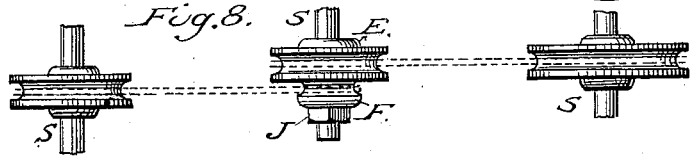
Witnesses
T. W. Fowler
H. B. Applewhaite
Inventor
Jacob Bachman,
By his Attorney Thomas P. Kinsey

UNITED STATES PATENT OFFICE.

JACOB BACHMAN, OF STONY RUN, PENNSYLVANIA.

FRICTIONAL DRIVING DEVICE.

SPECIFICATION forming part of Letters Patent No. 350,471, dated October 12, 1886.

Original application, No. 164,436, filed May 5, 1885. Divided and this application filed February 19, 1886. Serial No. 192,600.

(No model.)

*To all whom it may concern:*

Be it known that I, JACOB BACHMAN, a citizen of the United States, residing at Stony Run, county of Berks, State of Pennsylvania, have invented a new and useful Improvement in Frictional Driving Devices, of which the following is a specification.

This invention is related to the class of frictional drivers where the motor is so arranged, in combination with the friction device, as to transmit its power and velocity to the same in proportion to the pressure applied to the frictional surfaces of the device.

The object of the improvement is to furnish a simple, cheap, and effective device that may be applied at the extreme ends of the shaft, or intermediate to the bearings of the same, and in which the receiving gear, pulley, or sprocket wheel may be made to form a portion of the same.

The device may be operated in many ways. I show in the drawings herewith, forming a part of this specification, several alternative modes of mounting and operating the same.

Figure 1 represents in side elevation, partly in section, a shaft having the frictional device placed upon the same outside of the bearing, and operated by a screw threaded in a bracket attached to the frame. Fig. 2 represents a shaft with the friction driving device placed between the bearings and operated by a bifurcated lever fulcrumed upon a bracket attached at a suitable point to the frame. Fig. 3 represents in side elevation an application of the device for a circular-saw shaft, whereby the breakage of the saw, shaft, or fly-wheel is prevented; Fig. 4, a detail front and side elevation of the back collar or disk, which, according to location, may be fitted to a spline in the shaft or may form an integral portion of the same; Fig. 5, a detail of the central portion compounded with a second driver revolving freely upon the shaft, receiving motion from a motor and transmitting motion to an independent machine; Fig. 6, a detail of the front frictional disk with its pressure-cap extension. Fig. 7 represents in side elevation an arrangement whereby a constant and uniform speed is transmitted to the outer shaft, while an intermittent or variable speed is given to the intermediate shaft; Fig. 8, a plan of the same arrangement.

My device is applicable to all classes of machinery, from the smallest to the most ponderous construction. Wherever it is advisable in such machines to provide for sudden checks to the movement of parts of the same—for instance, a circular saw running at a high rate of speed through soft wood, with a strong feed, unexpectedly runs into a hard knot or piece of iron, driven into the same, the momentum of the fly-wheel is brought to a sudden stop, with great disruptive strain thrown upon the rim and torsional strain upon the shaft, tending to break both and scatter death or grievous wounds among the parties employed about the same. With my device applied as in Fig. 3, both pulley and fly-wheel being held between the frictional disks, the nut J is tightened up enough to prevent movement of the fly-wheel and pulley in advance of the shaft under ordinary conditions of use and revolutions; but, now, the saw striking a knot or bar of iron, as before described, the momentum of the fly-wheel and the pull of the belt upon the pulley would overcome the frictional resistance of the disks E F, the saw would come to a dead stop, and the pulley and fly-wheel would revolve upon the shaft, all risk of breakage and loss of life or limb being thereby avoided.

The use of my frictional device upon corn-shellers, feed-cutters, or any machine used by farmers, where the motive power is usually that of horses, will often save the machine from breaking, and also be a safeguard to those operating the same, as any sudden strain thrown upon the machine would be met by the revolution of the pulley upon instead of with the shaft, and the horses in the power could be controlled before the risk became imminent.

In running a series of machines in which the product is passed from one machine to the other, it is at times very desirable to vary the speed of passage through the intermediate machine without altering that of the machines through which the first and final pass is made. A mode of doing this is shown in Figs. 7 and 8, where the motor or first machine transmits motion to a double pulley, Fig. 5, or its equivalent, upon the driving-shaft of the intermediate machine, while a belt, band, or equivalent transmits motion from the same pulley to the driving-shaft of the last machine of the series.

In this arrangement the double pulley running free upon the shaft of the intermediate machine transmits with the proper speed, due to the diameter of its pulley, a constant and uniform velocity to the machinery of the final machine, while the intermediate machine will stand idle, or vary from a full stop to full speed, due to its connection with the first machine or shaft of the series, according to the pressure produced upon the frictional disks by the operator through suitable appliances provided for the purpose.

In the arrangement of small merchant grist or flour mill it is not an unusual practice to arrange four or more pairs of stones provided with vertical spindles and pulleys secured thereon around a vertical shaft having a corresponding number of pulleys upon the same, a belt from the main shaft pulley to its corresponding pulley upon the spindle giving motion to the stone. In mounting the pulleys upon the main vertical shaft, if they are so constructed as to have their hub-faces abut, or with a loose disk between the same, with a fixed collar at either the top of the upper pulley-hub or below the lower pulley-hub and at the opposite end of the shaft thereto, a disk, as described, with either a threaded portion of shaft and nut or a key by which pressure may be applied to the same, then, should any one pair of stones of the series become clogged from any cause, its special driven pulley would be held stationary with the shaft revolving in the same, and injury prevented thereby.

The construction of the device is as follows: When it can be done, I prefer to have the collar or disk E formed as an integral part of the shaft, or be securely keyed thereto, and, when that cannot conveniently be done, to have it so arranged that it shall bear with its back against some unyielding portion of the frame A, and be held against independent revolution by a pin, S', or its equivalent, as shown in Fig. 1. I make the disk in diameter of such size as will give sufficient frictional area of bearing to rigidly hold the pulley, wheel, or central driven portion, D, when desired, up to the full capacity of the work it is to perform. The central portion, D, let it be a sheave, pulley, gear-wheel, or other receiver of motion, has its two opposite sides or ends of the hub increased in diameter to correspond with the disk or collar E, and is fitted to revolve freely upon the shaft. A collar, F, of a similar diameter with E, is fitted to slide longitudinally upon the shaft, and is provided with a closed extension, F', when the device is hung outside of a bearing and operated by a screw, as shown in Fig. 1, or with a perforated extension, $F^2$, having a shifting groove therein, when mounted between bearings and operated by a lever, Q, as shown in Fig. 2, or with a simple perforated disk, F, when operated by a nut, as shown in Fig. 3, the disk F secured against independent revolution by a pin, $S^2$, said pin being secured in a threaded recess in said shaft by a male thread at one end of the same, the opposite or projected end being flattened upon two sides parallel with each other to fit the keyway of the disk F, and thus prevent any tendency to unscrew itself while in operative connection with said disk. A short feather-key may be substituted for the pin, a keyway, $F^3$, permitting its longitudinal movement. The central disk, pulley, or gear may be slipped in place upon the shaft against the disk E prior to the insertion of the pin or key $S^2$; or the hub may have a groove cut through the same, adapting it to pass over said pin or key subsequent to the insertion of the same.

The operation of the device is as follows: A suitable connection is made between the motor and the central receiving-body, D, as shown in Figs. 1 and 2, which will then revolve upon the shaft without putting the same in motion. The screw C or the lever Q is then operated so as to press the disk F against D and D against E, and, being thus held with more or less force, the shaft S, through its connections with the disks E F, will be revolved with more or less speed, according to the force applied thereto, a maximum force imparting to the shaft the full number of revolutions due to connection with the motor, and a minimum force barely moving the same.

I have shown this device applied to a reel for a reaper and binder in an application now pending, known as Serial No. 164,436, filed May 5, 1885, improved reel for binders, and in accordance with the directions of the Office I have canceled a claim for said device therein, and make this my divided application for a separate patent therefor.

Having shown the construction, operation, and use of my improved frictional driving device, I desire to secure by Letters Patent the following claim thereon:

In a frictional driving device, the combination of a central wheel, D, upon the shaft between the disks E and F, the disk E, the disk F, and the pin $S^2$, substantially as shown and described, and for the purpose set forth.

JACOB BACHMAN.

Witnesses:
JAMES R. KENNEY,
THOMAS P. KINSEY.